FIG. 1a

INVENTORS.
JOHN D. SUTHERLAND, JR.
STANFORD E. GROVES

BY Shanley & O'neil
ATTORNEYS.

FIG. 1b

INVENTORS.
JOHN D. SUTHERLAND, JR.
STANFORD E. GROVES

BY Shanley & O'neil
ATTORNEYS

United States Patent Office 3,565,873
Patented Feb. 23, 1971

3,565,873
METHOD AND APPARATUS FOR POLYMERIZING MONOMERIC MATERIALS
John D. Sutherland, Jr., Prairieville, and Stanford E. Groves, Baton Rouge, La., assignors to Copolymer Rubber & Chemical Corporation, a corporation of Louisiana
Filed Sept. 25, 1967, Ser. No. 670,346
Int. Cl. C08f 15/40
U.S. Cl. 260—80.78                                       17 Claims

ABSTRACT OF THE DISCLOSURE

The ratio of monomers, concentration of monomers, concentration of polymer solids, molecular weight of the polymer, and/or temperature of the polymerization mixture in a continuously operated solution polymerization reactor are simultaneously and effectively controlled by a novel method and improved apparatus.

---

This invention broadly relates to a novel method and improved apparatus for polymerizing monomeric materials. In some of its more specific variants, the invention further relates to a method and apparatus for simultaneously and effectively controlling the temperature and composition of the reactants and reaction mixture in a solution polymerization.

The present invention is useful in the polymerization of a wide variety of monomeric materials in solution in an organic solvent and in the presence of a polymerization catalyst. However, the invention is especially useful in the continuous solution interpolymerization of a mixture of olefin monomers in the presence of a Ziegler-type catalyst.

There are a number of problems which must be solved in the interpolymerization of a monomeric mixture containing two or more different olefin monomers. One problem involves controlling the composition of the final polymer product so that it is composed of the desired chemically bound mole percent of each monomer. Another problem is the removal of the heat of reaction from the polymerization vessel as the polymerizataion of olefin monomers is highly exothermic. The steps which are taken to solve these two problems must necessarily be such that the control of one set of variables does not upset or interfere with the control of the other.

Many other variables must be simultaneously controlled in continuously producing a polymer from a mixture of two or more monomers. These variables include: (1) the control of the ratio of monomers present in the reactor and in effective contact with the catalyst system, (2) the overall concentration of each monomer in the reactor, and (3) the dissolved solids content of the polymer in the liquid phase of the reactor. It has been very difficult heretofore to simultaneously and effectively control each of these three variables within narrow limits during a continuous polymerization process such as is practiced in the commercial production of solution polymers. It is imperative that all of the monomers be presented to the catalyst in the proper ratio if the desired final product is to be made. Thus, even if the proper ratio of gaseous monomers is fed to the reactor as in the prior art practices, during the time required to incorporate the monomers homogeneously into the reaction mixture, the catalyst will be in contact with a monomeric mixture of widely varying composition and the resulting polymer will likewise have a varying composition. Also, the liquid reaction mixture and normally gaseous monomers must be vigorously agitated in order for the gaseous monomers to be dissolved therein effectively. This is not possible in prior art solution polymerization vessels as the polymerization product or cement is highly viscous.

The dissolved solids content in the liquid phase of the reactor must be controlled within narrow operative limits so as to avoid unduly viscous reaction mixtures which are difficult to handle. Also, the overall temperature of the reaction mixture must be controlled within very narrow limits at a constant reaction pressure as minor variations greatly affect the concentration of the available dissolved monomers, and this in turn affects the overall Mooney viscosity or average molecular weight of the polymer product. If the temperature of the reaction mixture is not entirely uniform throughout, then the dissolved monomer concentrations vary at different points and polymer products with varying compositions and properties are produced at different points therein. This nonuniform polymerization is very undesirable in instances where a high quality product is desired. Examples of instances where the temperature varies markedly within prior art reactors include areas immediately adjacent the heat exchange or cooling surfaces which are used for removing the heat of reaction. The temperature differential is sufficient to cause substantially different polymer products to be produced and it has not been possible heretofore to uniformly polymerize the monomers even in instances where a monomer composition of constant composition is fed to the reactor for polymerization.

Heretofore a great deal of effort has gone into attempts to solve the problems mentioned above. However, prior to the present invention it has not been possible to simultaneously and continuously control, within narrow limits, the temperature of the reaction mixture, the ratio of monomers, the concentration of monomers, the concentration of polymer solids and/or the molecular weight of the polymer product. Accordingly, the present invention provides for the first time an entirely effective method and apparatus for overcoming the problems and deficiencies of the prior art.

It is an object of the present invention to provide a novel method of controlling the ratio of monomers present and available for polymerization in a solution polymerization reactor.

It is a further object to provide a novel method of effectively controlling the overall concentration of monomers in a solution polymerization reactor and/or the solids content in the liquid phase of the reactor.

It is a further object to provide a method of effectively controlling the temperature of a solution polymerization mixture throughout its entire mass and within sufficiently close limits so as to avoid the preparation of a nonuniform polymer product.

It is still a further object to provide a method of simultaneously controlling the molecular weight and the amount of each monomer which is chemically bound in the final polymer product produced in a continuous solution interpolymerization process.

It is still a further object to provide a novel method whereby the agitation requirements in a solution polymerization reactor are greatly reduced, thereby lowering capital and operating costs and allowing a more uniform polymer product to be produced.

It is still a further object to provide improved apparatus for use in practicing the method of the invention.

Still other objects and advantages of the invention will be apparent to those skilled in the art upon reference to the following detailed description, the examples and the accompanying drawings, wherein:

Figure 1A:
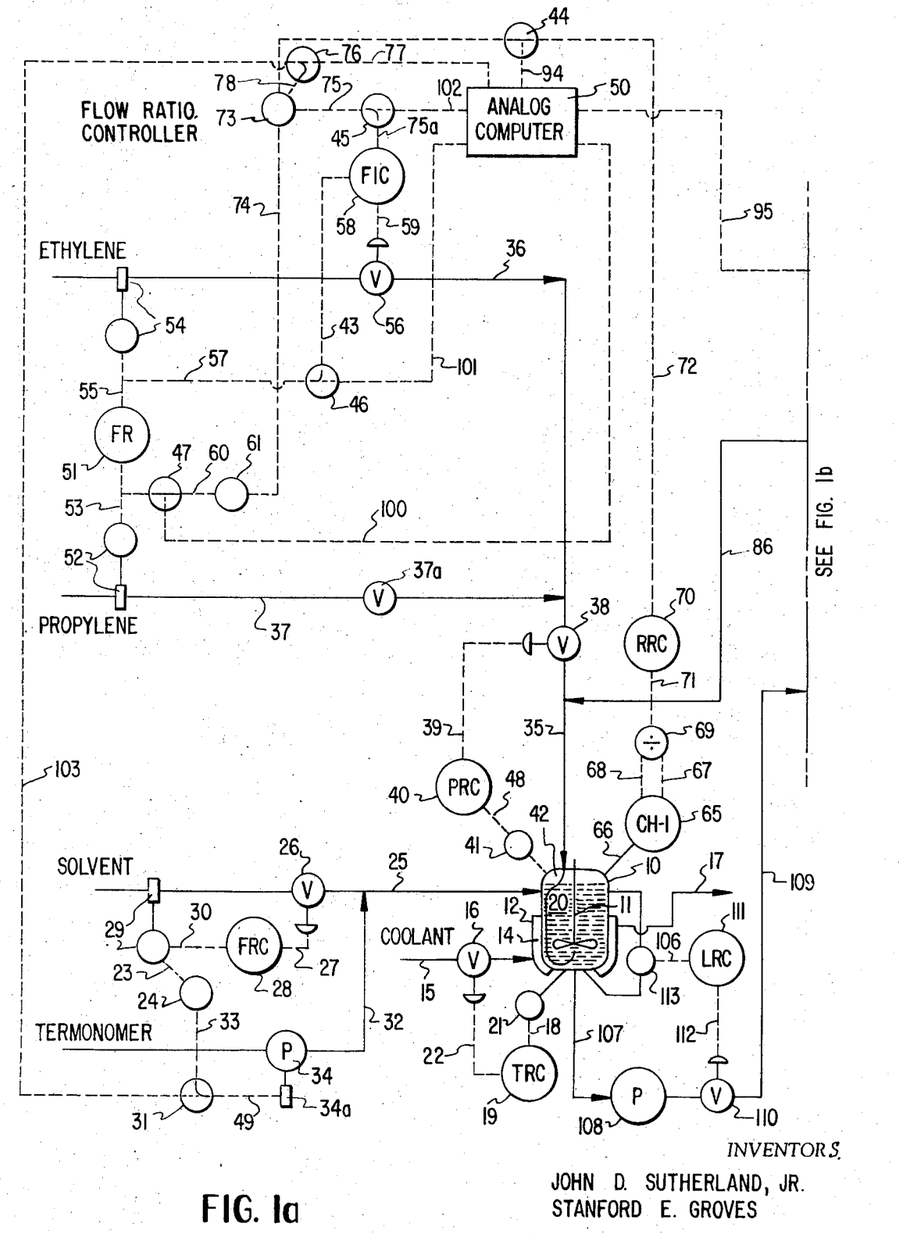
FIG. 1a is a flow diagram illustrating the arrangement of apparatus in a portion of one presently preferred system in accordance with the invention for the solution polymerization of ethylenically unsaturated monomeric materials.

Referring now to the drawings, absorber 10 is provided with a motor driven agitator 11 and a jacket 12 which forms an annular space 14 to which fluid coolant is supplied via conduit 15 at a rate controlled by valve 16 and withdrawn via conduit 17. The rate of feed of the coolant is determined by temperature recording controller 19, which receives temperature data via conduit 18 on the contents 20 of absorber 10 from temperature indicating and transmitting device 21, and then sends a pneumatic signal via conduit 22 which determines the setting of pneumatically controlled valve 16. The setting of valve 16 is such that sufficient coolant is supplied to provide a predetermined temperature for the contents 20.

An organic polymerization solvent such as hexane is supplied to absorber 10 via conduit 25 at a rate controlled by pneumatically controlled valve 26. The flow recorder controller 28 receives flow rate data in the form of a pneumatic signal from flow meter and transmitter 29 via conduit 30, and the valve 26 is opened or closed as necessary to maintain a desired continuous flow rate of hexane into the absorber 10 in response to a pneumatic signal transmitted via conduit 27.

The linearizer 24 receives hexane flow rate data from flow meter and transmitter 29 in the form of a square root pneumatic signal transmitted via conduit 23, converts the square root signal to a linear signal, and produces an output linear pneumatic signal which is responsive thereto. When the three-way pneumatic hand switch 31 is positioned to direct the output pneumatic signal from linearizer 24 via conduits 33 and 49 to the pneumatic speed control 34a on pneumatically speed controlled termonomer pump 34, as shown by the solid line in the three-way pneumatic hand switch 31, the rate of flow or amount of 5-ethylidene-2-norbornene or other termonomer fed to absorber 10 via conduits 32 and 25 is a predetermined function of the rate of flow or amount of hexane flowing in conduit 25. When the hand switch 31 is positioned to direct the pneumatic signal in conduit 103 via conduit 49 to the speed control 34a on termonomer pump 34, as shown by the broken line in the hand switch 31, then the rate of flow of termonomer in conduits 32 and 25 will be a predetermined function of the rate of flow of ethylene to absorber 10, as controlled by the flow ratio controller 73 and a pneumatic output signal to speed control 34a on pump 34 via conduits 78, 103 and 49, or as controlled by the analog computer 50 and a pneumatic output signal to speed control 34a and pump 34 via conduits 77, 103 and 49, depending upon the position of the three-way pneumatic hand switch 76.

Gaseous ethylene and liquid propylene are fed to conduit 35 via conduits 36 and 37 respectively, and then the resulting mixture is fed via conduit 35 into absorber 10 at a rate controlled by the setting of pneumatically controlled valve 38. The valve 37a in the propylene feed conduit 37 is normally opened. The valve 38 is opened or closed in response to a pneumatic signal received via conduit 39 from pressure recording controller 40, which in turn receives data via conduit 48 from pressure indicating and transmitting device 41 relating to the pressure level existing within the vapor space 42. The ethylene and propylene are fed to absorber 10 at a rate sufficient to maintain a desired predetermined pressure therein.

When the three-way pneumatic hand switches 44, 45, 46, 47 and 76 are turned to the positions which isolate the analog computer 50 from the pneumatic control circuitry, as shown by the solid lines in these switches, the rate of fresh ethylene feed to fresh propylene feed is determined by flow ratio controller 73. The flow recorder 51 receives data from flow meters and transmitters 54 and 52 via pneumatic conduits 55 and 53 on the rates of flow of ethylene and propylene in conduits 36 and 37, respectively. The linearizer 61 receives propylene flow rate data in the form of a square root signal from flow meter and transmitter 52 via pneumatic conduits 53 and 60, converts the square root signal to a linear signal that can be used by flow ratio controller 73 to determine the proper ethylene feed rate, and produces a linear output pneumatic signal that is transmitted to flow ratio controller 73 via conduit 74. The flow ratio controller 73 then produces an output pneumatic signal which is transmitted via pneumatic conduits 75 and 75a to set the ethylene flow indicator controller 58 at the ethylene feed rate that is expected to result in the predetermined desired ratio of ethylene to propylene in absorber 10. Data on the flow rate of ethylene in conduit 36 is transmitted via pneumatic conduits 55, 57 and 43 to ethylene flow controller 58, which then produces a pneumatic output corrective signal as necessary that is transmitted to pneumatically controlled valve 56 via pneumatic conduit 59 to open or close the same as required to maintain the desired set ethylene flow rate and the ethylene to propylene ratio. The flow recorder controller 73 continues to supply the preset ratio of ethylene with respect to propylene in this manner to conduit 35 and absorber 10 until the ratio in the vapor space 42 is outside of the permissive limits. When the ratio in the vapor space 42 becomes outside of the predetermined limits, corrective action must be taken in response to a signal from the chromatograph 65 in order to maintain the desired ethylene to propylene ratio in the absorber 10.

The ratio of ethylene to propylene within the liquid phase 20 of absorber 10 can be determined accurately by measuring the ratio of ethylene to propylene which exists in the vapor space 42 by means of a vapor fractometer or chromatograph 65, which is in communication with the vapor space 42 by means of conduit 66. The chromatograph 65 withdraws a sample of the gaseous mixture existing in vapor space 42 via conduit 66, analyzes it for the ethylene and propylene contents, and supplies these data via pneumatic conduits 68 and 67, respectively, to calculating device 69. The device 69 calculates the ratio of ethylene to propylene and feeds the resulting data via pneumatic conduit 71 to the ratio recorder controller 70. The ratio controller 70 compares the ratio data supplied via conduit 71 with its preset input point, and corrective action which results in an output pneumatic signal is taken when the ratio is outside of the preset input points. The output signal resulting from the comparison of the data on the ratio of ethylene to propylene which actually exists within vapor space 42 with the desired ratio which is the preset input point in ratio controller 70, is then fed via pneumatic conduit 72 to flow ratio controller 73. The flow ratio controller 73 produces a corrective output pneumatic signal that is transmitted via conduits 75 and 75–a to reset the ethylene flow indicator controller 58, which in turn adjusts valve 56 to give the flow of ethylene which must be fed via conduit 36 to maintain the desired ratio within vapor space 42.

A mixture of recycled ethylene, propylene and some hexane and water is fed from the polymer recovery step via conduit 80 to accumulator 81, where the liquid hexane is removed. The ethylene-propylene gaseous mixture and vaporized water and hexane are withdrawn via conduit 82 and compressed by means of compressor 83. The compressed ethylene and propylene contain water which would deactivate the polymerization catalyst to be described hereinafter and it must be removed prior to the polymerization step. Thus, the compressed stream of ethylene and propylene flowing in conduit 84 is passed to drier 85 which contains a prior art dessicant for removing water therefrom, such as silica gel, activated alumina or a molecular sieve. A stream of ethylene and propylene gas substantially free of moisture, i.e., less than 10 parts per million by volume, is withdrawn via conduit 86 at a rate controlled by valve 87 and passed to conduit 35 where it is admixed with the fresh ethylene and propylene from conduits 36 and 37. The valve 87 is opened and closed in response to a pneumatic signal supplied via conduit 88 from pressure recording controller 89, which is in turn responsive to the pressure data received from pressure indicating and transmitting device 90 in communication with the interior of accumulator 81 via conduit 91. In this manner, the flow rate of recycle mixture from accumulator 81 is maintained equivalent to the input flow rate thereto via conduit 80, as the valve 87 is opened when the pressure therein exceeds a predetermined level. In instances where there is insufficient recycle monomer, the compressed monomer stream may be recycled from conduit 84 to conduit 82, via conduit 92 and back pressure valve 93, thereby controlling the maximum discharge pressure on compressor 83.

With continuous operation under ideal conditions, the ratio and flow rate of unreacted ethylene and propylene monomers in conduit 86 is the same as in conduit 166. However, often the operating conditions are less than ideal and the quantity of ethylene and/or propylene that is available for recycle may vary to some extent. It is largely this variable ratio and flow rate that upsets the carefully predetermined ratio existing in the streams fed via conduits 36 and 37, and necessitates the resetting of flow ratio controller 73 as described above. Thus, the reset mechanism compensates for variables in the ratio and flow rate of the ethylene and propylene in the recycle stream, and also other variables which may be due to unknown causes.

In the foregoing discussion, the three-way pneumatic hand switches 44–47 and 76 were assumed to be turned to positions as shown by the solid lines which isolate the analog computer 50, and place the flow ratio controller 73 in the pneumatic control circuitry for the purpose of controlling the ethylene to propylene ratio. In the following discussion, it will be assumed that the hand switches 44–47 and 76 are turned to positions, as shown by the broken lines in these switches, which isolate flow rate recording controller 73, and place the analog computer 50 in the circuitry for controlling the rates of flow in the monomer streams fed via conduits 32, 36 and 37.

Upon reference to the pneumatic circuitry to analog computer 50, it may be noted that data are continuously received via pneumatic conduits 72 and 94 from the ratio controller 70 on the ethylene to propylene ratio existing within vapor space 42. This data is obtained using the same apparatus and method as was described above, but instead of being fed to flow ratio controller 73, it is fed to the analog computer 50. The analog computer also receives data via pneumatic conduit 95 on the flow rate of the recycle monomer stream flowing in conduit 84, which is determined by flow meter and transmitter 97. The flow meter and transmitter 97 also feed data to flow recorder 96 via pneumatic conduit 98. Data are provided on the flow rate of propylene in conduit 37 via pneumatic conduits 53, 60 and 100, as determined by flow meter and transmitter 52, and on the flow rate of ethylene in conduit 36, via pneumatic conduits 55, 57 and 101, as determined by flow meter and transmitter 54. From this information, the analog computer 50 calculates the flow of fresh ethylene which is necessary at a given propylene flow rate to maintain the desired ratio thereof in the vapor space 42. If the ratio of ethylene to propylene in vapor space 42 falls outside of the predetermined limits and an adjustment is necessary, then a pneumatic corrective signal is transmitted via conduits 102 and 75–a to flow controller 58. The flow controller 58 transmits a signal via conduit 59 to valve 56, thereby opening or closing the same and varying the flow rate of ethylene in conduit 36 as necessary to provide the correct ratio. When hand switches 31 and 76 are turned to the positions shown by the broken lines in these switches, a pneumatic signal also may be supplied from analog computer 50 via pneumatic conduits 77, 103 and 49 to variable speed pump 34 to thereby supply a desired ratio or amount of termonomer via conduits 32 and 25 to absorber 10.

When the analog computer 50 is used, it receives data continuously on the flow rates of the streams involved, i.e., the fresh ethylene, the fresh propylene and the recycled ethylene and propylene streams. If the flow rate of one stream should change, for example the recycled ethylene and propylene stream, the analog computer senses this and presets the flow rates of the other streams to compensate for the change. This is done immediately and without waiting for the controlled variable, i.e., the actual ethylene to propylene ratio in the vapor phase of the absorber 10, to deviate from the desired ratio. The flow ratio controller 73 must wait for the actual ratio of ethylene to propylene in the vapor phase of the absorber 10 to change before it can reset the flow rates of the streams to compensate. Thus, the time required for the flow ratio controller to compensate for a major upset is much longer than for the analog computer.

A stream of hexane solvent containing dissolved ethylene, propylene and a termonomer such as 5-ethylidene-2-norbornene is withdrwan from absorber 10 via conduit 107 and transferred by means of pump 108 through conduit 109 at a rate controlled by valve 110. The level controller 111 receives data via conduit 106 on the liquid level of the contents 20 from level indicating and transmitting device 113, and the valve 110 is operated thereby in response to a signal supplied via pneumatic conduit 112. Thus, when operating on a continuous basis the valve 110 is opened and closed as necessary to discharge the contents 20 at the rate of feed to absorber 10.

Figure 1B:
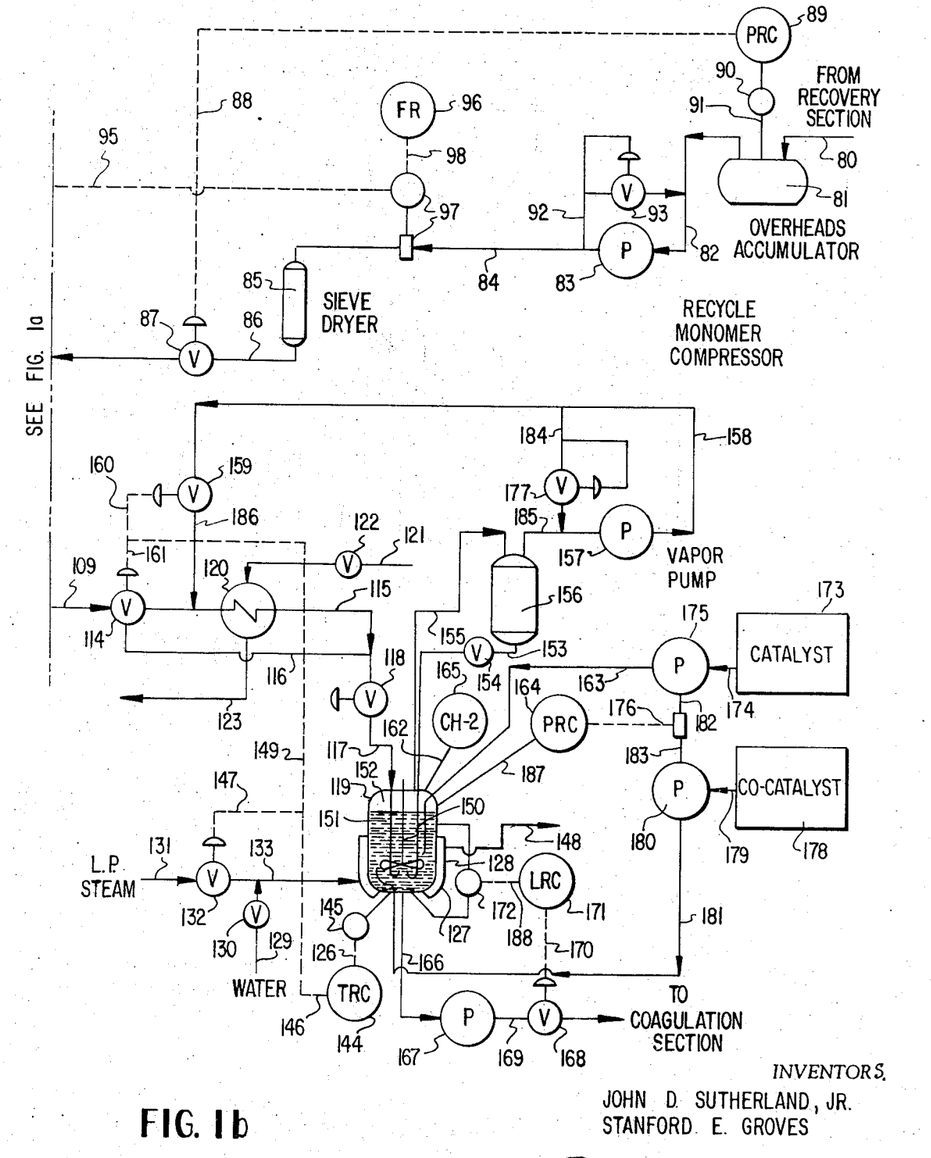
FIG. 1b is a continuation of the flow diagram of FIG. 1.

The stream flowing in conduit 109 may have a pressure of aproximately 40–50 p.s.i.g. and a temperature of about 30–40° F., and it is passed through three-way valve 114, conduit 115 or 116, and conduit 117 including back-pressure valve 118 to reactor 119. The stream flowing in conduit 109 is normally passed through conduit 115 and cooler 120 where the heat of solution of recycled monomer is removed in a manner which will be more fully described hereinafter. A heat exchange fluid is supplied to cooler 120 via conduit 121 at a rate controlled by valve 122 and is withdrawn therefrom via conduit 123. During start-up operations, it is not necessary to cool the stream flowing in conduit 109 and it is passed via conduit 116. The reactor 119 also may be provided with heating means for use during start-up operations only to assure a desired elevated initial polymerization temperature. This may be accomplished by means of a jacket 127 which forms an annular space 128 into which water is fed via conduits 129 and 133 at a rate controlled by valve 130. The water is heated by means of low pressure steam supplied via conduit 131 at a rate controlled by pneumatically operated valve 132 and withdrawn via conduit 148. The valve 132 is opened or closed as necessary to provide the proper initial polymerization temperature within reactor 119, as determined by temperature controller 144. The temperature controller 144 receives temperature data via conduit 126 from temperature indicating and transmitting device 145, and then transmits signals via pneumatic conduits 146 and 147 to valve 132, conduits 146, 149 and 160 to valve 159, and conduits 146, 149, and 161 to valve 114.

The reactor 119 is provided with a motor driven agitator 150 which assures a homogeneous composition for the liquid reaction mixture 151. A vapor space 152 is provided above the liquid level, and a conduit 155 is in communication therewith through which gaseous monomers are withdrawn, passed through vessel 156 wherein entrained liquid is removed and returned to reactor 119 upon opening valve 154 in conduit 153, and the liquid-free vapor is passed from vessel 156 via conduit 185 to vapor pump 157. A stream of monomer vapor under a higher pressure than exists in conduit 115 is withdrawn from pump 157 via conduit 158 and is then passed via conduit 186 into conduit 115 at a rate controlled by pneumatically operated valve 159 and admixed with the liquid stream flowing in conduit 115. After dissolving the gaseous monomers in the liquid solvent in conduit 115, the mixture is passed through cooler 120 where the heat of solution is removed. The stream withdrawn via conduit 117 and returned to reactor 119 may have the same temperature as the stream flowing in conduit 109. However, for the highest efficiency, the temperature of the stream in conduit 115 is at least as low as that of the stream in conduit 109.

In order to provide a desired uniform temperature in reactor 119, the temperature controller 144 supplies a pneumatic signal via conduits 146, 149 and 160 which determines the setting of the valve 159, and thereby determines the amount of gaseous monomer that is withdrawn via conduit 155 and recycled. Thus, when the temperature is above the preset level, gaseous monomer is withdrawn via conduit 155 and returned to the reactor 119 via conduits 185, 158, 186, 115 and 117 on a continuous basis. As the gaseous monomer passes from the liquid phase 151 to the gaseous phase 152, there is a phenomenon involved which results in a marked cooling effect as the heat of dissolution is imparted to the liquid phase by the monomers in passing to the gaseous phase. It is possible to cool the entire body of liquid 151 due to the dissolution of the monomers throughout the body and the rate of dissolution, and thus the rate of cooling, may be easily controlled at any desired level by the setting of valve 159. Gaseous monomers may be recycled from conduit 158 to conduit 185 via conduit 184 at a rate controlled by back pressure valve 177 to thereby even out the rate of flow and reduce surges in the pressure.

The reactor 119 does not have internal cooling coils or any internal surfaces other than the reactor walls and the agitator 150, and all the surfaces in contact with the body of liquid 151 are at the temperature thereof. Thus, the entire body of liquid 151 is at the desired polymerization temperature and all of the polymer is produced at that temperature.

A catalyst and a co-catalyst, which may be components for preparing a prior art Ziegler catalyst to be described more fully hereinafter, are withdrawn from storage vessels 173 and 178, passed to variable speed pumps 175 and 180 via conduits 174 and 179, and then passed into the reactor 119 via conduits 163 and 181, respectively. The rates at which the catalyst and co-catalyst are passed into reactor 119 are determined by the speeds at which variable speed pumps 175 and 180, respectively, are operated, and the relative speeds are such that a constant ratio of catalyst to co-catalyst is passed into reactor 119. The speed of operation of pumps 175 and 180 is in response to the pressure existing within the vapor space 152, as determined by pressure controller 164. Data on the pressure existing in vapor space 152 are fed to pressure controller 164 via conduit 187. When the pressure is above a preset level, the controller 164 transmits pneumatic signals via conduits 176 and 182 to pump 175, and via conduits 176 and 183 to pump 180, and the catalyst and co-catalyst are added to reactor 119 via conduits 163 and 181, respectively, until the pressure drops due to more rapid polymerization and depletion of the normally gaseous monomers. When the pressure drops below a preset level, the catalyst and co-catalyst feed rates are reduced to decrease the polymerization rate and thereby increase the pressure. Preferably, the catalyst and co-catalyst are fed on opposite sides of the agitator 150, and in the zone of greatest turbulence which is usually at the tips of the agitator blades.

The composition of the vapor space 152 is determined by means of monomer samples withdrawn via conduit 162 and analyzed by chromatograph 165. This assures that the proper ethylene to propylene ratio exists within the reactor 119.

A solution of the resulting polymer in the hexane solvent is withdrawn via conduit 166 and passed to pump 167 at a rate controlled by valve 168. The pneumatically controlled valve 168 in conduit 169 is opened and closed in response to a pneumatic signal received via conduit 170 from liquid level controller 171, which is in turn in response to data on the level of liquid 151 existing within reactor 119 as determined by liquid level indicator and transmitter 172 from data supplied thereto via conduit 188. Thus, a desired liquid level is maintained continuously within reactor 119.

The resulting solution of polymer flowing in conduit 169 is processed in accordance with the prior art to recover solid polymer, unreacted monomers and solvent therefrom. For instance, the catalyst may be killed by addition of a catalyst deactivating agent such as isopropyl alcohol, other lower alcohols or water, with vigorous agitation. The solution is then passed into a coagulator which is partially filled with hot water at a temperature above the boiling point of hexane. Steam is supplied to the coagulator, and the monomers and hexane solvent are recovered overhead. The solid polymer crumb is withdrawn from the coagulator, stripped free of traces of monomers and solvents, washed, dried and baled in accordance with prior art practice. The hexane solvent may be recycled in the process via conduit 25 after purification and drying. Also, the unreacted monomers may be recovered, purified by distillation or other means when necessary, and recycled to the process via conduit 80. If desired, all or part of the monomers may be recovered in a separator ahead of the coagulation step.

From the foregoing description, it may be seen that the ratios of monomers are controlled upstream from the absorber 10. Also, one of the monomers is allowed to flow at a predetermined rate independent of the remaining monomers, and the flow ratio controller 73 or the analog computer 50, depending upon which one is on stream, receives a signal from the flow meter on each of the monomer lines and controls the flow of the dependent monomer or monomers to maintain the desired ratio with the independent monomer. In a sense, the flow ratio control system disclosed herein is not concerned with the rate of flow of the independent monomer and does not control it. The system only monitors the flow rate of the independent monomer and then controls the flow of the dependent monomer or monomers to maintain the desired ratios. The total rate of flow of monomers is controlled by the absorber pressure controller 40 in response to the demand for additional monomers in the absorber 10 in order to reach liquid/vapor equilibrium at the controlled temperature and pressure conditions as fresh solvent is supplied thereto.

The ratio of monomers is preset due to the process requirements and thus the basis for the control of the absorber 10 is that the monomer-solvent system at equilibrium has three variables with two degrees of freedom. The three variables are temperature, pressure and concentration of the mixed monomers in the solvent and by fixing any two of these variables, the system at equilibrium is fully defined. It is necessary to have sufficient monomer to maintain liquid-vapor equilibrium in the reactor 119 and in addition to this, the reactor 119 must contain sufficient monomer to make the desired quantity of polymer. The total of these two requirements constitutes the total monomers required in the absorber. Therefore, when these components are brought together in the absorber, they constitute a system for which equilibrium data can be calculated and the temperature and pressure of the absorber are set at points which will, at equilibrium, provide the desired total concentration of monomers in the solvent.

The temperature of the absorber contents 20 may be controlled independently in a conventional way, such as by the coolant supplied to the space 14 and by providing vigorous agitation. The temperature that is chosen is not critical, and need only fit into the polymerization scheme for the reactor 119. The pressure must be one that will, at the chosen temperature, cause the desired quantity of monomers to be dissolved in the liquid phase of the absorber. The fresh solvent is fed to the absorber 10 on independent flow control and the rate of solvent flow determines the polymer production rate of the plant as the pressure control-flow ratio control system will cause adequate monomers to be fed to maintain the liquid phase at the desired monomer concentration. The rate of flow out of the absorber to the reactor 119 is controlled by the liquid level controller 111, and thus the rate of input of monomers and solvent is equal to the rate of outflow. Therefore, the feed to the reactor 119 is uniform and constant. Also, due to the absorber operating at equilibrium, either the liquid or the vapor phase is adequate to define the composition of the contents.

The basis for the control of the reactor 119 is somewhat similar to that of the absorber 10 as each of the two vessels operates at equilibrium based on a controlled flow of hexane. The feed stream from the absorber 10 to the reactor 119 is controlled by the liquid level controller 111, and the temperature of the reactor 119 is controlled independently. Consequently, with the temperature for the reactor 119 being predetermined and the ratio and concentration of monomers being controlled in the absorber 10, it is only necessary to control the pressure of the reactor 119 to establish equilibrium.

The pressure in reactor 119 is controlled by varying the feed rate of catalyst and, with independent temperature control, the system operates as follows: Inasmuch as the monomer ratio and concentration are preset in the absorber for each unit volume of solvent admitted to the reactor, there is only sufficient monomer contained therein to maintain equilibrium condititons in the reactor 119, plus an additional quantity necessary to form the amount of polymer required to make a reaction mixture having the desired solids content. Consequently, as fresh feed enters the reactor 119, a portion of the monomers contained therein is converted to polymer. If the amount converted to polymer is more than desired, then there is no longer sufficient monomers per unit of solvent to maintain the equilibrium pressure. This causes an incipient reduction of the pressure in reactor 119, and in turn causes the pressure controller 164 to reduce the catalyst feed rate until only the desired amount of monomer from each unit of solvent is polymerized. Conversely, if too little monomer from each unit of feed is converted to polymer, then the pressure of reactor 119 tends to rise. The pressure controller 164 then causes an increase in the catalyst feed rate via conduit 163 until exactly the correct amount of monomer is converted to polymer.

The independent temperature control on the reactor 119 must be very precise in order to allow the remainder of the control system to accomplish its purpose. However, if prior art heat transfer surfaces are used, temperature control in the reactor 119 is not as easily accomplished as in the absorber 10. In the absorber 10, only clean nonviscous hydrocarbons are present and conventional schemes for the removal of heat are very effective. The liquid 151 in the reactor 119 is thick, viscous, tends to plate out on chilled surfaces, and is very difficult to agitate and form a homogeneous system with a gaseous phase. As a result, the prior art cooling systems are unsatisfactory due to fouling of the heat transfer surfaces and lack of flexibility. It is therefore necessary to have the novel reactor cooling system of the invention in combination with the remainder of the control system.

The cooling scheme for the reactor 119 eliminates the two objections mentioned above in that there is no heat transfer surface therein which is in use during continuous polymerizatiton. Also, the cooling system has a much higher degree of flexibility and faster response rate as it is based upon the heat of solution of dissolved hydrocarbon monomer vapors or gases in the liquid hydrocarbon solvent. Prechilling of the hydrocarbon mixture in the absorber to a temperature such as 50° F. reduces the heat load on the reactor 119 in that some of the heat of polymerization is used to bring the mixture of entering reactants up to the operating temperature of the reactor 119. The prechilling may be capable of removing between 30 and 70 percent of the total heat load, depending upon the solids content of the cement and the heat of reaction for the specific monomeric mixture. The remaining heat of polymerization is removed by the cooling system of the invention. Monomer vapor is withdrawn from the reactor vapor space 152, recirculated in vapor form and without condensation to a point downstream of the absorber but upstream of a secondary heat exchanger, then the vapor is dissolved in the incoming liquid fresh solvent-monomer stream with the exothermic heat of solution causing warming of the resulting solution, and the combined stream is passed through the heat exchanger 120 where the heat of solution is removed and the temperature of the stream is adjusted to a desired value. The cooled stream is then passed into the reactor 119 as a liquid phase. Thus, each pound of gaseous monomer mixture that leaves the reactor 119 via conduit 155 is returned thereto dissolved in the organic solvent. This has the net effect of removing the heat of solutiton for the dissolved compounds, plus the sensible heat representing the difference between the temperature of the chilled feed and the temperature of the reactor contents. The withdrawal of vapor from reactor 119 via conduit 155 does not change the composition of the reactor contents as the vapor is returned thereto via conduit 117, nor does the withdrawal of the vapor change the pressure in the reactor.

The cooling system for the reactor carries out the heat transfer in the secondary heat exchanger 120 where only clean, nonviscous hydrocarbons are involved. The only cooling effect in the reactor 119 is the dissolution of dissolved hydrocarbons into the vapor space 152, and it has been discovered that this takes place with equal ease in either a viscous or nonviscous liquid. Also, surprisingly the dissolution occurs throughout each unit volume of the contents 151, and thus the cooling effect occurs throughout the body of liquid and is not limited to the surface. The cooling system of the invention has good flexibility as the ability to control the temperature of the reactor 119 is limited only by the ability to circulate the vapor phase from space 152. The cooling system is not affected by the temperature or pressure at which the reactor 119 is operated as the heat of solution of the hydrocarbon monomers does not vary greatly with temperature and pressure over the ranges normally used for polymerization.

Surprisingly, it is possible to operate the reactor 119 at a temperature lower than the incoming stream of monomer and solvent or the coolant which is used in the heat exchanger 120. As long as the recirculated vapors of monomer are dissolved in the incoming solvent stream and the heat of solution is removed before the stream enters the reactor 119, the necessary cooling effect is accomplished.

The present invention may be used in the solution polymerization of a wide variety of monomers which are gaseous at the temperature of the polymerization. Examples of olefins which may be polymerized include straight and/or branched chain monolefins containing, for example, 2–20 carbon atoms and preferably 2–10 carbon atoms; aromatic olefins substituted with one or more vinyl groups such as styrene, vinyl naphthalene and divinyl benzene; conjugated diolefins containing 4–20 and preferably 4–8 carbon atoms such as butadiene, isoprene, piperylene and 2,3-dimethylbutadiene; linear polyenes containing 3–20 and preferably 3–10 carbon atoms such at allene, 1,2-butadiene, 1,4-hexadiene and 1,5-hexadiene; and bridged ring hydrocarbons containing one or more ethylenic double bonds such as the norbornenes, and especially the alkylidene norbornenes and alkenyl norbornenes. Mixtures of two or more of the above monomers may be interpolymerized.

It is understood that the foregoing monomeric materials are mentioned for purposes of illustration only, and that numerous other monomeric materials may be polymerized. The invention is very useful in the preparation of rubbery polymers such as cis-1,4-polybutadiene, cis-1,4-polyisoprene, styrene-butadiene rubber copolymers, ethylene-propylene copolymers, and ethylene-propylene-polyene terpolymers.

The reaction conditions that are suitable for the preparation of polymers from the foregoing monomers are well known and are described in a large number of issued United States patents and other publications, including the following: Introduction to Rubber Technology, edited by M. Morton, Reinhold Publishing Corporation, New York (1959); Synthetic Rubber Technology, volume I, by W. S. Penn, McLaren and Sons, Ltd., London (1960); Rubber, Fundamentals of its Science and Technology, J. Le Bras, Chemical Publishing Company, Inc., New York (1957); and Linear and Stereoregular Addition Polymers, N. G. Gaylord, et al., Interscience Publishers, New York (1959).

Many presently preferred sulfur curable elastomers are produced by interpolymerizing a monomeric mixture containing ethylene, at least one straight chain alpha monoolefin containing 3–6 carbon atoms, and a polyunsaturated hydrocarbon having at least one carbon-to-carbon double bond, in solution in an organic polymerization solvent and in the presence of a Ziegler-type catalyst. The basic reaction conditions and ratios of monomers may be the same as those employed in the prior art, and usually the residual unsaturation should be about 2–60 carbon-to-carbon double bonds per 1000 carbon atoms. It is preferred that the monomeric mixture contain ethylene, propylene and a polyunsaturated bridged-ring type hydrocarbon in proportions to produce a polymer having good elastomeric properties and an unsaturation level of at least 2 carbon-to-carbon double bonds per 1000 carbon atoms. For example, the elastomer may contain chemically bound therein molar ratios of ethylene to propylene varying between about 80:20 and 20:80. The bridged-ring hydrocarbon may be chemically bound therein in an amount to provide an unsaturation level of 2–60, and preferably about 2–30 carbon to carbon double bonds per 1000 carbon atoms. The specific unsaturation level that is selected in a given instance will depend upon the desired rate of cure or other property.

In instances where it is desired to prepare a tetrapolymer, or a polymer from five or more different monomers, then one or more alpha monoolefins containing 4–6 carbon atoms may be submitted for an equal molar quantity of bound propylene in the above-mentioned monomer compositions. When preparing tetrapolymers, the range of the fourth monomer will normally be about 5–20 mole percent, but smaller amounts may be used such as 1, 2, 3, or 4 mole percent.

Examples of the bridged-ring hydrocarbons include the polyunsaturated derivatives of bicyclo (2,2,1) heptane wherein at least one double bond is present in one of the bridged rings, such as dicyclopentadiene, bicyclo (2,2,1) hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo (2,2,2) octane as represented by bicyclo (2,2,2) octa-2,5-diene, polyunsaturated derivatives of bicyclo (3,2,1) octane, polyunsaturated derivatives of bicyclo (3,3,1) nonane, and polyunsaturated derivatives of bicyclo (3,2,2) nonane. At least one double bond is present in a bridged ring of the above compounds, and at least one other double bond is present in a bridged ring or in a side chain. Further examples of polyunsaturated bridged-ring hydrocarbons and their use in the preparation of prior art rubbers are found in United States Pats. Nos. 2,933,480; 3,093,620; 3,093,621 and 3,211,709, the disclosures of which are incorporated herein by reference.

Especially preferred elastomers have molar ratios of ethylene to propylene chemically bound therein varying between 70:30 and 55:45. Specific examples of polyene which may be used include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene or 5-(3-methyl-2-butenyl) norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The polymerization solvent may be any suitable inert or saturated hydrocarbon which is liquid and relatively nonviscous under the reaction conditions, including the prior art solvents for the solution polymerization of monoolefins in the presence of a Ziegler-type catalyst. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler-type catalyst.

Catalysts in accordance with the prior art may be used in preparing the foregoing elastomers. Suitable prior art Ziegler-type catalysts are disclosed in a large number of issued patents, such as United States Pats. Nos. 2,933,480, 3,093,620, 3,093,621, 3,211,709 and 3,113,115. Examples include metal organic coordination catalysts prepared by contacting a compound of a metal of Groups IVa, Va, VIa, VIIa and VIIIa of the Mendeleeff periodic chart of the elements, as typified by titanium, vanadium and chromium halides, with an organometallic compound of a metal of Groups I, II or III of the Mendeleeff periodic chart which contains at least one carbon-metal bond, as typified by trialkylaluminum and alkylaluminum halides wherein the alkyl groups contain 1–20 and preferably 1–4 carbon atoms.

The preferred Ziegler-type catalyst for polymerizing a monomeric mixture of ethylene, propylene and a diolefin is prepared from a vanadium compound and an alkylaluminum halide. Examples of suitable vanadium compounds include vanadium trichloride, vanadium tetrachloride, vanadium oxychloride, vanadium acetylacetonate, VO (tertbutyl)$_3$, etc. Activators which are especially preferred include alkylaluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethylaluminum sesquichloride and vanadium oxychloride is especially preferred, and when using this catalyst, the optimum ratio of the catalyst components is usually 1 mole of vanadium oxychloride for each 8–20 moles of the alkylaluminum sesquichloride.

The foregoing detailed description, the drawings, and the following specific examples are for purposes of illustration only, and are not intended as being limiting to the spirit or scope of the appended claims.

EXAMPLE I

This example illustrates the preparation of a rubbery terpolymer in accordance with the present invention when employing apparatus similar to that illustrated in FIGS. 1a and 1b of the drawing.

A terpolymer was prepared from the following ingredients:

| | |
|---|---|
| Ethylene | 15.7 lbs./hr. |
| Propylene | 58.1 lbs./hr. |
| Hexane solvent | 398 lbs./hr. |
| 5-(mixed 2 and 3 methyl-2-butenyl)-2-norbornene.[1] | 1.65 lbs./hr. |
| Pyridine | Equivalent to 3 moles/mole of vanadium in the catalyst fed to the reactor. |

[1] A mixture of 5-(2-methyl-2-butenyl)-2-norbornene and 5-(3-methyl-2-butenyl)-2-norbornene which is referred to hereinafter as MBN.

The ingredients were fed continuously to the absorber, which operated at 40° F. and 45 p.s.i.g., in quantities controlled by the instrumentation shown in the drawing. The ingredients were agitated in the absorber to thereby produce a hexane solution of the monomers and pyridine, and the solution was cooled to 40° F. by heat exchange with a coolant supplied to the jacket of the absorber.

The solution of fresh reactants was withdrawn continuously from the absorber at a temperature of 40° F. and passed to a pump where the pressure was increased to 70 p.s.i.g. Prior to passing the solution of fresh reactants into the reactor, it was mixed with recycle hydrocarbon vapor withdrawn from the reactor, and the recycle hydrocarbon vapor was dissolved in the fresh reactants under a pressure of 70 p.s.i.g. The temperature of the resulting mixture was increased due to the heat of solution, and the resulting warmed mixture was then passed through a heat exchanger and cooled to 40° F. for the purpose of removing the heat of solution. Prior to passing the cooled mixture into the reactor, it was passed through a pressure control valve and the pressure was reduced from 70 p.s.i.g. to that existing within the reactor, which was about 30 p.s.i.g.

A 0.05 molar hexane solution of vanadium oxytrichloride was fed continuously into the reactor through a regulated variable volume metering pump at a rate equivalent to 140 g. of elastomer product per millimole of vanadium oxytrichloride. A 0.05 molar hexane solution of methyl aluminum sesquichloride was fed into the reactor by means of a metering pump at a rate of 15 moles of aluminum per mole of vanadium in the vanadium oxytrichloride solution. The above two catalyst component streams were fed to the reactor so as to discharge within the liquid contents on opposite sides of the agitator and at the periphery thereof. The exothermic polymerization reaction in the reactor was controlled by the instrumentation illustrated in the drawings at a temperature of 107° F. and at a pressure of 30 p.s.i.g., with the temperature varying no more than 0.5° F. and the pressure no more than 0.5 p.s.i.g. from the set points. Hydrocarbon vapor was released from the reactants at the rate of 129.4 pounds per hour to give the necessary reactor cooling, and these vapors were recycled and redissolved in the incoming stream of reactants as described above. A vapor pump was used for withdrawing the vapor and increasing the pressure theeron prior to mixing it with the fresh solution of reactants.

A terpolymer of ethylene, propylene and MBN formed in solution in the hexane solvent, and the resulting polymer cement containing unreacted ethylene, propylene and MBN was withdrawn continuously from the bottom of the reactor and passed to a prior art coagulation process. The polymer cement contained 6 pounds of the terpolymer per 100 pounds of hexane solvent plus residuals. The terpolymer was produced at a rate of 28.5 pounds per hour and contained chemically bound therein 13.6 pounds of ethylene, 13.6 pounds of propylene, and 1.32 pounds of MBN. The polymer was in solution with 44.5 pounds per hour of unreacted propylene, 2.1 pounds per hour of unreacted ethylene, 0.33 pound per hour of MBN, and 398 pounds per hour of hexane.

The polymer cement withdrawn from the reactor was passed continuously through a zone of intense agitation and rapidly admixed therein with water for the purpose of deactivating the catalyst. The polymer cement was then coagulated by vaporizing the hexane solvent in an agitated vessel containing hot water to which steam was supplied on a continuous basis. The resulting crumb rubber was stripped to remove all solvent and monomer residues, washed, dried, and baled following prior art practice.

The terpolymer contained 47.7 percent by weight of ethylene, 47.7 percent by weight of propylene, and 4.7 percent by weight of MBN. The unsaturation level was 4.0 carbon-to-carbon double bonds per 1000 carbon atoms. The extractable material as determined by extraction with ethyl alcohol-toluene azeotrope was 1 weight percent, and the gel content as determined by the standard ASTM procedure in Decalin at 135° C. was 0. The Mooney value was 70 ML 1+8 (250° F.). The molecular weight distribution index as determined by gel permeation chromatography was 3 to 4. A commercially available elastomer prepared from ethylene, propylene and a different type of diene monomer had a molecular weight distribution index of 7 to 9, thereby proving that the elastomer of the invention has an unusually low molecular weight distribution index. This is very desirable.

A fractionation of the polymer product was carried out using a gel permeation chromatograph, and analysis of the various individual fractions showed a very uniform composition over the entire molecular weight range. A similar fractionation and analysis of a commercially available terpolymer prepared from ethylene, propylene and a different diene monomer showed wide variations in the compositions of the various fractions.

The elastomer was tested following standard test procedures to determine the tensile strength, modulus, elongation, ΔT Shore hardness and compounded Mooney viscosity. The test recipe contained by weight 100 parts of the elastomer, 80 parts of ISAF carbon black, 55 pounds of processing oil, 5 pounds of zinc oxide, 1 pound of stearic acid, 0.75 pound of mercaptobenzothiazole, 1.50 pounds of tetramethylthiuram monosulfide, and 1.5 pounds of sulfur. The ingredients were uniformly mixed and then cured at 320° F. for 25 minutes. The following data were obtained:

Tensile strength—2900 p.s.i.
Modulus—1000 p.s.i.
Elongation—600%
ΔT (Goodrich Flexometer)—75° F.
Shore hardness—50-60
Compounded Mooney ML–4—85

It is apparent from the foregoing data that a highly satisfactory terpolymer product was produced.

During the continuous operation of the absorber and reactor, the following observations were made:

(1) The temperature of the reactor contents could be easily maintained within 0.5° F. of the set temperature.

(2) The pressure in the reactor could be easily maintained within 0.5 p.s.i.g. of the desired set temperature.

(3) The composition of the terpolymer was unusually uniform, and could be maintained within 1 weight percent of the desired ethylene composition, based on analysis of hourly samples.

(4) The desired Mooney viscosity of the elastomer of 70 ML 1+8 (250° F.) could be closely maintained based on hourly samples of polymer product.

(5) The average residence time in the reactor was 90 minutes.

(6) There was no evidence of foaming in the reactor due to evolution of the hydrocarbon vapors, and there was no polymer cement carry-over in the vapor line from the reactor to the vapor pump.

(7) There was only a very slight polymer buildup on the reactor walls.

(8) There was no cycling of the reactor pressure or temperature, thereby indicating thorough mixing.

The flexibility of the process of the invention was demonstrated by operating under various conditions, as follows:

(1) It was possible to produce a terpolymer product having a Mooney viscosity ranging from 20 to 200 ML 1+8 (250° F.) by maintaining a constant reactor pressure and changing the temperature of the solution of reacting monomers. The lower Mooney value of 20 ML 1+8 (250° F.) was made by changing the reaction temperature to 115° F., and the higher Mooney value of 200 ML 1+8 (250° F.) was made by changing the reaction temperature to 80° F.

(2) The solids content of the cement withdrawn from the reactor was increased up to 13% by weight by increasing the absorber pressure to 90 p.s.i.g., and making corresponding increases in pressure in the reactor. It was possible to maintain the same close degree of control of temperature, pressure and molecular weight during operation at the higher solids content.

EXAMPLE II

This example illustrates the prior art method of removing the heat of reaction from a reactor.

A reactor provided with a cooling jacket and internal cooling coils, to which prior art coolants are fed, and an agitator is used in practicing this example. All of the conditions in Example I are unchanged with the exception of not recycling the hydrocarbon vapors from the reactor for cooling purposes. The cooling jacket and internal cooling coils are relied upon exclusively for heat removal.

The load on the reactor cooling jacket and the horsepower input on the agitator are very high. Even so, the viscous cement is not sufficiently well mixed to assure a uniform temperature throughout the agitated reactor contents. There is a substantial temperature gradient in the reacting monomers due to the cold surfaces which are used for cooling.

The temperature control instrumentation used in attempting to maintain the mixture at a uniform temperature is not effective due to the large temperature gradient. The mixing of the reactants is not sufficiently adequate to reduce the temperature gradient throughout the reacting liquid, nor is it adequate to maintain a uniform composition so that all of the elastomer is produced under the same conditions of monomer concentration, monomer ratio, catalyst concentration, etc.

The reaction conditions vary from one portion of the reacting liquid to the next, and this markedly changes the Mooney plasticity of the product.

The molecular weight distribution and molecular composition are also changed and vary during the course of the reaction. Therefore, the properties and quality of the polymer are not predictable and a non-uniform product is produced.

EXAMPLE III

This example illustrates operation of the reactor in accordance with the present invention, but without the absorber. The conditions employed in this example were otherwise the same as in Example I, except as noted hereinafter.

The hexane, pyridine and MBN are mixed with the monomers recycled from the reactor for heat control purposes. The fresh gaseous ethylene and propylene are fed directly into the reactor where they are mixed with the hexane feed containing the recycle monomers, the MBN and pyridine. Thus, the reactor serves as a mixing vessel as well as a reactor, and there is a significant increase in the agitation requirements. It is not possible to mix the monomer feeds in the viscous reacting cement and maintain uniform conditions of monomer concentrations and ratios, such as is realized in Example I.

High concentrations of monomers are localized in the reactor at the feed point, and there is a gradient of concentration across the reactor. A portion of the polymer has a high concentration of bound ethylene, and especially the polymer produced at the feed point due to the high reactivity of ethylene as compared with propylene. Also, crosslinking of the polymer occurs due to the lack of homogenous pyridine concentrations throughout the reaction mixture.

There is a large variation in the product Mooney viscosity, and it is not possible to regulate the operating conditions to give a predictable Mooney viscosity. Additionally, the variable monomer concentrations and non-uniform monomer ratios cause changes in the molecular weight distribution and the composition of the individual fractions obtained with the aid of the gel permeation chromatograph, and a poor quality and/or off-specification polymer is produced.

The reactor cooling load is also increased significantly due to the necessity for removing the heat of solution of the gaseous monomers that are fed directly to the reactor. This heat of solution, and especially when taken with the increased heat of agitation due to the higher agitation requirements, appreciably increases the volume of the gaseous hydrocarbon phase that is released from the reaction mixture in the reactor and recycled to maintain the temperature. The increased heat load is more than 5 times that existing when operating in accordance with the process given in Example I, and it is necessary to greatly increase the vapor pump and cooling system capacity. Operation of the reactor is difficult due to the release of the large volume of monomers from solution to supply the extra cooling. This causes violent or excessive foaming and frothing of the reacting polymer cement, and polymer cement is entrained in the vapor handling system and it is necessary to shut down the equipment for cleaning purposes.

EXAMPLE IV

A flow ratio controller is used in operating the apparatus of Example I. This example illustrates the improved results that are obtained when an analog computer is substituted for the flow ratio controller, with all other conditions being the same as in Example I except as noted hereinafter.

As gas chromatograph sampled the gas phase of the absorber operating at 40° F. and 45 p.s.i.g. A gas sample was taken every 7½ minutes and analyzed for ethylene and propylene. The ethylene content was 71.5 mole percent and the propylene content was 24.9 mole percent.

The ethylene and propylene contents as determined by the chromatograph were transmitted every 7½ minutes to a pneumatic dividing computer which converted this data to the ratio of moles of ethylene per mole of propylene. The signal from the dividing computer was transmitted to a primary ratio controller having an adjustable hand-set point. This set point was 2.9 moles of ethylene for each mole of propylene. The output from the primary ratio controller is a pneumatic signal, and the signal was received by a flow ratio controller which includes a pneumatic multiplying computer. This latter device also received a pneumatic signal from the propylene flow metering device. By using the two signals, the multiplying computer calculated the required ethylene flow rate to satisfy the set point on the primary ratio controller, and a pneumatic signal was transmitted to the ethylene flow controller to position the set point thereof. The ethylene flow controller in turn positioned the ethylene flow control valve by a pneumatic signal. The combination of the primary ratio controller, the multiplying computer and the ethylene flow controller constituted a flow ratio control system. Thus, from the ethylene and propylene concentrations as determined by the gas chromatograph, which took a gas sample from the absorber gas every 7½ minutes, adjustments were initiated to control the ethylene flow to the absorber to thereby maintain a 2.9 mole ratio of ethylene to propylene in the absorber vapor space. The polymer product when using this control system contained 48.7 weight percent of ethylene, 48.7 weight percent of propylene, and 2.4 weight percent of the MBN. Based on the analysis of hourly samples, the above concentrations of bound monomers did not vary over 1% in any instance.

The above control system was capable of controlling the reaction within acceptable limits, and especially when considering the usual lag times involved in process systems of this type. While the control system gave good control of the polymer composition under normal conditions of operation, it did have limitations when a high speed of response was needed to correct for a major upset condition, such as would be encountered by a sudden failure of the recycle monomer compressor. In such a case, it required 5–8 hours for the system to recover and produce specification products having the above composition. Thus, a faster response is desirable in instances when there is equipment failure, and also when starting up the process.

When an analogue computer installation is substituted for the multiplying computer and the ethylene flow controller segments of the above flow ratio control system, much improved results are obtained. When using the analogue computer, the output signal from the following instrumentation is received by the analogue computer:

(1) The primary ratio controller having an adjustable hand-set point.

(2) The recycle monomer flow measuring device in the line feeding the same to the absorber.

(3) The fresh propylene flow measuring device.

(4) The fresh ethylene flow measuring device.

The unreacted ethylene-propylene ratio in the recycle monomer stream is known as it does not differ substantially from the ratio existing in the cement withdrawn from the reactor. When using the above received signals, the analog computer instantaneously totalizes the propylene flow (fresh and recycle), and adjusts the fresh ethylene feed to maintain the proper ethylene concentration in the absorber, as required by the hand-setting on the primary ratio controller. The same gas chromatograph analyzes the absorber vapor for ethylene and propylene, and these data are sent to the same analyzer and dividing computers mentioned above.

In a system using the analog computer, the analog computer instantaneously senses process upsets and adjusts the fresh ethylene feed input and the termonomer feed input to within 98 percent of the feed requirements within 15 minutes. The gas chromatograph analyzer then may be used to make the finer adjustments on the feed control to bring the ethylene flow to within the last 2 percent of the required fresh feed. It is therefore apparent that greatly improved results are used when the analog computer is substituted for a flow ratio control system.

What is claimed is:

1. A process for copolymerizing two or more ethylenically unsaturated monomeric materials in solution in an organic polymerization solvent which is liquid at atmospheric pressure in the presence of an active polymerization catalyst comprising the steps of dissolving monomeric material including at least one ethylenically unsaturated monomer which is gaseous at the polymerization temperature in the polymerization solvent, the monomeric material being soluble in the polymerization solvent and having an exothermic heat of reaction when polymerized to produce polymer, the polymerization solvent increasing in temperature upon dissolving the ethylenically unsaturated monomer therein and the resulting solution decreasing in temperature upon dissolution of gaseous ethylenically unsaturated monomer therefrom, introducing the solution of monomeric materials into a polymerization zone, introducing a polymerization catalyst into the polymerization zone and polymerizing monomeric material therein to produce polymer with the release of heat due to the exothermic heat of raction of the monomeric material, a portion of the ethylenically unsaturated monomeric material which is dissolved in the solution in the polymerization zone undergoing dissolution and being evolved as a gaseous phase whereby at least a portion of the heat of reaction is removed, withdrawing the evolved gaseous monomeric material from the polymerization zone, dissolving monomeric material evolved from the polymerization zone in the solution of monomeric materials dissolved in the polymerization solvent, passing the combined solution of monomeric material and monomeric material evolved from the polymerization zone through a heat exchanger for removal of heat of solution before introduction into the polymerization zone, measuring the vapor phase in the polymerization zone, increasing the amount of catalyst introduced into the polymerization zone in response to increase in pressure in the vapor phase and decreasing the amount of catalyst introduced into the polymerization zone in response to decrease in the pressure measured in the vapor phase, and withdrawing polymerization solvent containing polymer from the polymerization zone.

2. The process of claim 1 wherein the gaseous ethylenically unsaturated monomeric material withdrawn from the polymerization zone is compressed and dissolved in the solution of monomeric material in the polymerization solvent under a higher pressure than that existing in the polymerization zone, removing the heat of solution by heat exchange with a coolant while the solution is under a pressure higher than that existing in the polymerization zone, the temperature of the resulting cooled solution is below the polymerization temperature, reducing the pressure on the cooled solution and introducing the cooled solution into the polymerization zone at a temperature below the polymerization temperature to thereby remove a portion of the heat of reaction, and the gaseous ethylenically unsaturated monomeric material is withdrawn from the polymerization zone at a rate to remove a further portion of the heat of reaction due to the cooling effect of dissolution and thereby maintain the polymerization temperature at a predetermined level.

3. The process of claim 1 wherein the monomeric material includes a plurality of ethylenically unsaturated monomers, passing a stream of the solution of monomeric material initially containing the monomers in the desired ratio substantially continuously into the polymerization zone, and in which the gaseous ethylenically unsaturated monomeric material withdrawn from the polymerization zone is dissolved in the solution whereby the desired ratio of monomers is maintained in the polymerization zone.

4. The process of claim 3 wherein the catalyst is introduced into the polymerization zone at a rate responsive to changes in the pressure, the rate of catalyst feed being increased when the pressure rises above a predetermined level and decreased when the pressure falls below a predetermined level whereby the pressure in the polymerization zone is controlled, the withdrawn gaseous ethylenically unsaturated monomer material is compressed and dissolved in the solution under a higher pressure than that existing in the polymerization zone, the solution is withdrawn from the absorption zone and thereafter the heat of solution is removed by heat exchange with the coolant while the solution is under a pressure higher than that existing in the polymerization zone, the temperature of the resulting cooled solution is below the polymerization temperature, the pressure on the cooled solution is reduced and it is introduced into the polymerization zone at a temperature below the polymerization temperature to thereby remove a portion of the heat of reaction, and the gaseous ethylenically unsaturated monomeric material is withdrawn from the polymerization zone at a rate to remove a further portion of the heat of reaction due to the cooling effect of dissolution and thereby maintain the polymerization temperature at a predetermined level.

5. The process of claim 4 wherein the monomeric mixture includes at least one substance selected from the group consisting of normally gaseous alpha monoolefins and diolefins, and the catalyst is a Ziegler polymerization catalyst for the monomeric mixture.

6. The process of claim 4 wherein the monomeric mixture contains ethylene, propylene and a bridged ring compound containing 7–20 carbon atoms which is interpolymerizable with the ethylene and propylene, and the catalyst is a Ziegler polymerization catalyst for the monomeric mixture.

7. The process of claim 6 wherein the bridged ring compound is 5-ethylidene-2-norbornene.

8. A process for copolymerizing two or more ethylenically unsaturated monomeric materials in solution in an organic polymerization solvent which is liquid at atmospheric pressure in the presence of an active polymerization catalyst comprising the steps of introducing an increment of the organic polymerization solvent into a first absorption zone, introducing an increment of monomeric material including a plurality of ethylenically unsaturated monomers which are soluble in the solvent into the first absorption zone and dissolving the monomeric material in the solvent, the first absorption zone containing a body of the resulting solution with a vapor space thereabove, the monomeric material having an exothermic heat of reaction when polymerized to produce polymer and including a first ethylenically unsaturated monomer which is gaseous at the polymerization temperature, the polymerization solvent increasing in temperature upon dissolving the first monomer therein and the resulting solution decreasing in temperature upon the dissolution of gaseous first monomer therefrom, the monomeric material also including a second ethylenically unsaturated monomer, the first and second monomers being introduced into the first absorption zone and dissolved in the solvent in quantities to produce a substantially saturated solution thereof under the temperature and pressure conditions existing in the first absorption zone, the first and second monomer being volatile at the temperature of the solution in the first absorption zone and the vapor containing a gaseous mixture of the first and second monomers, the gaseous phase first and second monomers in the gaseous mixture being in substantial equilibrium with the dissolved first and second monomers in the body of solution whereby the molar ratio of the first monomer to the second monomer in the body of solution may be calculated from the molar ratio thereof in the gaseous mixture, analyzing the gaseous mixture and determining the molar ratio of the first monomer to the second monomer which is present therein, comparing the thus determined existing molar ratio in the vapor phase with the molar ratio therein which is in equilibrium with the body of solution when it cotains the desired predetermined molar ratio of the first monomer to the second monomer and determining the molar ratio of the first monomer to the second monomer in an additional increment of monomeric material giving the desired predetermined molar ratio thereof in the vapor phase when introduced into the first absorption zone, introducing additional increments of the polymerization solvent and the monomeric material into the first absorption zone, the first and second monomers being present in the additional increments of monomeric material in substantially the molar ratio thus determined to give the desired molar ratio in the vapor phase and in quantities to produce a substantially saturated solution under the temperature and pressure conditions existing in the first absorption zone, withdrawing an increment of solution from the first absorption zone, introducing the solution of monomeric material into a polymerization zone, introducing a polymerization catalyst into the polymerization zone and polymerizing monomeric material therein to produce polymer with the release of heat due to the exothermic heat of reaction of the monomeric material, a portion of the monomeric material including the first monomer which is dissolved in the solution in the polymerization zone undergoing dissolution during the polymerization and being evolved as a gaseous phase whereby at least a portion of the heat of reaction is removed, withdrawing additional increments of the solution from the first absorption zone and introducing them into the second absorption zone, the additional increments of the solution initially being substantially saturated with respect to the first and second monomers at the temperature and pressure existing in the first absorption zone and containing the first and second monomers in substantially the molar ratio that is desired in the polymerization zone, at least one of the temperature and pressure conditions of the withdrawn increments of solution being modified prior to introducing them into the second absorption zone whereby the increments of solution are no longer saturated with respect to at least the first monomer, withdrawing the evolved gaseous monomeric material from the polymerization zone, dissolving the withdrawn gaseous monomeric material in the additional increment of the solution of monomeric material in the polymerization solvent, passing the combined solution through a heat exchanger for removal of heat of solution before introduction into the polymerization zone, measuring the vapor phase in the polymerization zone, increasing the amount of catalyst introduced into the polymerization zone in response to increase in pressure in the vapor phase and decreasing the amount of catalyst introduced into the polymerization zone in response to the decrease in pressure measured in the vapor phase, and withdrawing polymerization solvent containing polymer from the polymerization zone.

9. The process of claim 8 wherein the additional increments of the monomeric material are introduced into the first absorption zone at feed rates responsive to changes in the pressure, the rate of feed being increased when the pressure rises above the predetermined level and decreased when the pressure falls below a predetermined level whereby the pressure in the first absorption zone is controlled and a substantially saturated soltuion is produced.

10. The process of claim 8 wherein the molar ratio of the first monomer to the second monomer in the additional increments of monomeric material is determined by means of an analog computer, the total feed of the first monomer to the first absorption zone is calculated by the computer, and the feed of the second monomer to the first absorption zone is controlled thereby to provide the desired molar ratio.

11. The process of claim 8 wherein the gaseous monomeric material withdrawn from the polymerization zone is compressed and dissolved in the solution under a higher pressure than that existing in the polymerization zone, thereafter the heat of solution is removed by heat exchange with a coolant while the solution is under a pressure higher than that existing in the polymerization zone, the temperature of the resulting cooled solution is below the polymerization temperature, the pressure on the cooled solution is reduced and it is introduced into the polymerization zone at a temperature below the polymerization temperature to thereby remove a portion of the heat of reaction, and the gaseous ethylenically unsaturated monomeric material is withdrawn from the polymerization zone at a rate to remove a further portion of the heat of reaction due to the cooling effect of dissolution and thereby maintain the polymerization temperature at a predetermined level.

12. The process of claim 8 wherein a stream of the solution of monomeric material initially containing the first and second monomers in the desired ratio is passed substantially continuously from the first absorption zone into the polymerization zone, a stream of the gaseous monomeric material is withdrawn substantially continuously from the polymerization zone and dissolved in the solution and a stream of the resulting solution is passed substantially continuously into the polymerization zone whereby the desired ratio of the first and second monomers is maintained in the polymerization zone.

13. The process of claim 12 wherein the additional increments of the monomeric material are introduced into the first absorption zone at feed rates responsive to changes in the pressure, the rate of feed being increased when the pressure rises above a predetermined level and decreased when the pressure falls below a predetermined level whereby the pressure in the first absorption zone is controlled and a substantially saturated solution is produced, the catalyst is introduced into the polymerization zone at a rate responsive to changes in the pressure, the rate of catalyst feed being increased when the pressure rises above a predetermined level and decreased when the pressure falls below a predetermined level whereby the pressure in the polymerization zone is controlled, the withdrawn gaseous monomeric material is compressed and dissolved in the solution under a higher pressure than that existing in the polymerization zone, the solution is withdrawn from the second absorption zone and thereafter the heat of solution is removed by heat exchange with the coolant while the solution is under a pressure higher than that existing in the polymerization zone, the temperature of the resulting cooled solution is below the polymerization temperature, the pressure on the cooled solution is reduced and it is introduced into the polymerization zone at a temperature below the polymerization temperature to thereby remove a portion of the heat of reaction, and the gaseous monomeric material is withdrawn from the polymerization zone at a rate to remove a further portion of the heat of reaction due to the cooling effect of dissolution and thereby maintain the polymerization temperature at a predetermined level.

14. The process of claim 13 wherein the molar ratio of the first monomer to the second monomer in the additional increments of monomeric material is determined by means of an analog computer, the total feed of the first monomer to the first absorption zone is calcuated by the computer, and the feed of the second monomer to the first absorption zone is controlled thereby to provide the desired molar ratio.

15. The process of claim 13 wherein the monomeric mixture includes at least one substance selected from the group consisting of normally gaseous alpha monoolefins and diolefins, and the catalyst is a Ziegler polymerization catalyst for the monomeric mixture.

16. The process of claim 13 wherein the monomeric mixture contains ethylene, propylene and a bridged ring compound containing 7–20 carbon atoms which is interpolymerizable with the ethylene and propylene, and the catalyst is a Ziegler polymerization catalyst for the monomeric mixture.

17. The process of claim 16 wherein the bridged ring compound is 5-ethylidene-2-norbornene.

References Cited

UNITED STATES PATENTS

| | | | |
|---|---|---|---|
| 2,484,384 | 10/1949 | Levine | 260—683.15 |
| 3,086,965 | 4/1963 | Weedman | 260—94.9 |
| 3,131,033 | 4/1964 | Volkenburgh | 23—289 |
| 3,227,526 | 1/1966 | Scoggin | 23—288 |
| 3,259,614 | 7/1966 | Pollock | 260—93.7 |
| 3,300,458 | 1/1967 | Manyik | 260—88.2 |
| 3,350,376 | 10/1967 | Wisseroth | 260—93.7 |

JOSEPH L. SCHOFER, Primary Examiner

R. S. BENJAMIN, Assistant Examiner

U.S. Cl. X.R.

260—88.2

UNITED STATES PATENT OFFICE
CERTIFICATE OF CORRECTION

Patent No. 3,565,873                    Dated February 23, 1971

Inventor(s) John D. Sutherland et al.

It is certified that error appears in the above-identified patent and that said Letters Patent are hereby corrected as shown below:

Column 2, last line, "Fig. 1" should read -- Fig. 1a --.
Column 12, line 45, "Mendeleef" should read -- Mendelejeff --
Column 21, claim 13, line 27, cancel "from the second absorpt zone".

Signed and sealed this 15th day of June 1971.

(SEAL)
Attest:

EDWARD M. FLETCHER, JR.                WILLIAM E. SCHUYLER, JR.
Attesting Officer                      Commissioner of Patents